(12) United States Patent  (10) Patent No.: US 7,243,570 B2
Kuehnhoefer et al.  (45) Date of Patent: Jul. 17, 2007

(54) POWER-ASSISTED STEERING WITH ELECTRIC MOTOR LOCKING DEVICE

(75) Inventors: Thomas Kuehnhoefer, Heubach (DE); Rainer Biegert, Boehmenkirch (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 76 days.

(21) Appl. No.: 11/241,655

(22) Filed: Sep. 29, 2005

(65) Prior Publication Data

US 2006/0162991 A1    Jul. 27, 2006

Related U.S. Application Data

(63) Continuation of application No. PCT/EP2004/03636, filed on Apr. 6, 2004.

(30) Foreign Application Priority Data

Apr. 7, 2003  (DE)  ............................... 103 15 704

(51) Int. Cl.
    *F16H 35/00*  (2006.01)
(52) U.S. Cl. ...................... 74/388 PS; 74/492; 74/493; 180/422; 180/446; 475/18
(58) Field of Classification Search ............ 74/388 PS, 74/492, 493; 180/446, 422, 444; 475/18
    See application file for complete search history.

(56) References Cited

U.S. PATENT DOCUMENTS 6,164,150 A   12/2000 Shindo et al.
6,904,999 B2 *  6/2005 Kojo et al. .................. 180/422
7,004,281 B2 *  2/2006 Hidaka ........................ 180/446
7,118,506 B2 * 10/2006 Zheng et al. .................. 475/18

FOREIGN PATENT DOCUMENTS

| DE | 196 01 826 | 7/1997 |
| DE | 198 23 031 | 11/1998 |
| DE | 696 07 371 | 8/2000 |
| DE | 100 00 219 | 7/2001 |
| DE | 101 17 059 | 10/2001 |

* cited by examiner

*Primary Examiner*—David M. Fenstermacher
(74) *Attorney, Agent, or Firm*—Jordan and Hamburg LLP

(57) ABSTRACT

A power-assisted steering with a superimposing gear mechanism enables safe steering behavior independently of the type of transmission used. A mechanical lock is mounted at a part of the transmission, preferably at the screw itself. In the event of a malfunction, this lock acts in addition to the deactivation of an electric motor and reliably prevents it from rotating further in that a locking pin engages elongated hole-shaped grooves. The shape of the grooves has the advantage that the locking pin need not be positioned very precisely. Allowances are thus made for installation tolerances. The development of noise is also reduced since it is very improbable that the locking pin, before it is locked in one of the grooves, would first of all come into contact with an intermediate bridge and thus produce an unpleasant clacking noise. In addition, a diagnostic circuit may be provided which checks the function of the lock before the vehicle is started up.

9 Claims, 3 Drawing Sheets

POWER-ASSISTED STEERING WITH ELECTRIC MOTOR LOCKING DEVICE

BACKGROUND OF THE INVENTION

The invention relates to a power-assisted steering with an electric motor and a superimposing gear mechanism, which superimposes a correction angle on the steering angle that is specified by the steering handle. In such a power assisted steering, the gear ratio of the steering transmission is not a fixed quantity and may be set variably, depending on different parameters, such as the vehicle speed and the driving situation that is arising.

The DE-A1-19801826 discloses such power-assisted steering. A steering system is described there, which has an electric motor and a superimposing gear mechanism, which is controlled by the electric motor and superimposes a correction angle on the steering angle specified at the steering handling device of a vehicle. An auxiliary turning motion is superimposed on the turning motion brought about by the driver. Moreover, the rotor of the electric motor is connected with a mechanical part of the superimposing gear mechanism, such as a worm gear or a skew gear, over which the movement, generated by the electric motor and superimposed on the manual turning movement, is fed into the steering. The extent of the superimposing depends, for example, on the actual speed of the vehicle. With such power-assisted steering, it is possible to vary the transmission ratio very flexibly. For example, it is very helpful, if the gear ratio is smaller when the vehicle is moving quickly than when it is moving slowly or is being parked. Even a failure of the power assistance due to a malfunction of the electric motor or of its electronic control would not result in a dangerous situation for the driver, since the driver basically could steer the vehicle even without the help of power assistance.

However, defects or malfunctions, which cause an unintended movement of the motor and, with that, an unintended intervention in the power-assisted steering, cannot be excluded in the electric motor itself or in its electronic control.

In the DE-A-1000219, a power assisted steering with an improved superimposing gear mechanism is proposed, which has, among other things, a "self-locking worm gear" (refer to column 2, lines 18 to 30 as well as claim 13 there). This construction is used to reduce the backlash in the mutually meshing transmission parts. However, it is not mentioned there that such a self-locking gear mechanism can also help to reduce the problems mentioned above, namely, to counteract the risky effects resulting from faults or malfunctions occurring in the steering.

Practical experience has shown that, in the case of (an intentional or unintentional) failure of the servomotor, there is a high degree of uncertainty in steering a vehicle even if a self-locking worm gear is present. This means that a safety risk, which cannot be disregarded, remains particularly in the case of worm gears or other types of gear mechanisms, which do not have a self-locking feature.

It is therefore an object of the invention to provide power-assisted steering of the type given above with a safeguarding device, by means of which unintentional power-assisted steering is prevented independently of the of gear mechanism used.

Accordingly, the electric motor is provided with a mechanical lock, which deactivates the electric motor in addition to an electrical deactivation and which, at least in situations in which there is a malfunction, locks the mechanical part of the superimposing gear mechanism and secures it against movement, in that the gear mechanism part (such as the worm, the worm gear or the skew gear) is provided with elongated hole-shaped grooves, which are engaged by a pin of the mechanical lock.

Advantageous developments arise out of the dependent claims.

The invention is now described in greater detail by means of an example, reference being made to the following diagrammatic drawings.

DESCRIPTION OF THE PREFERRED EMBODIMENTS

Figure 1:
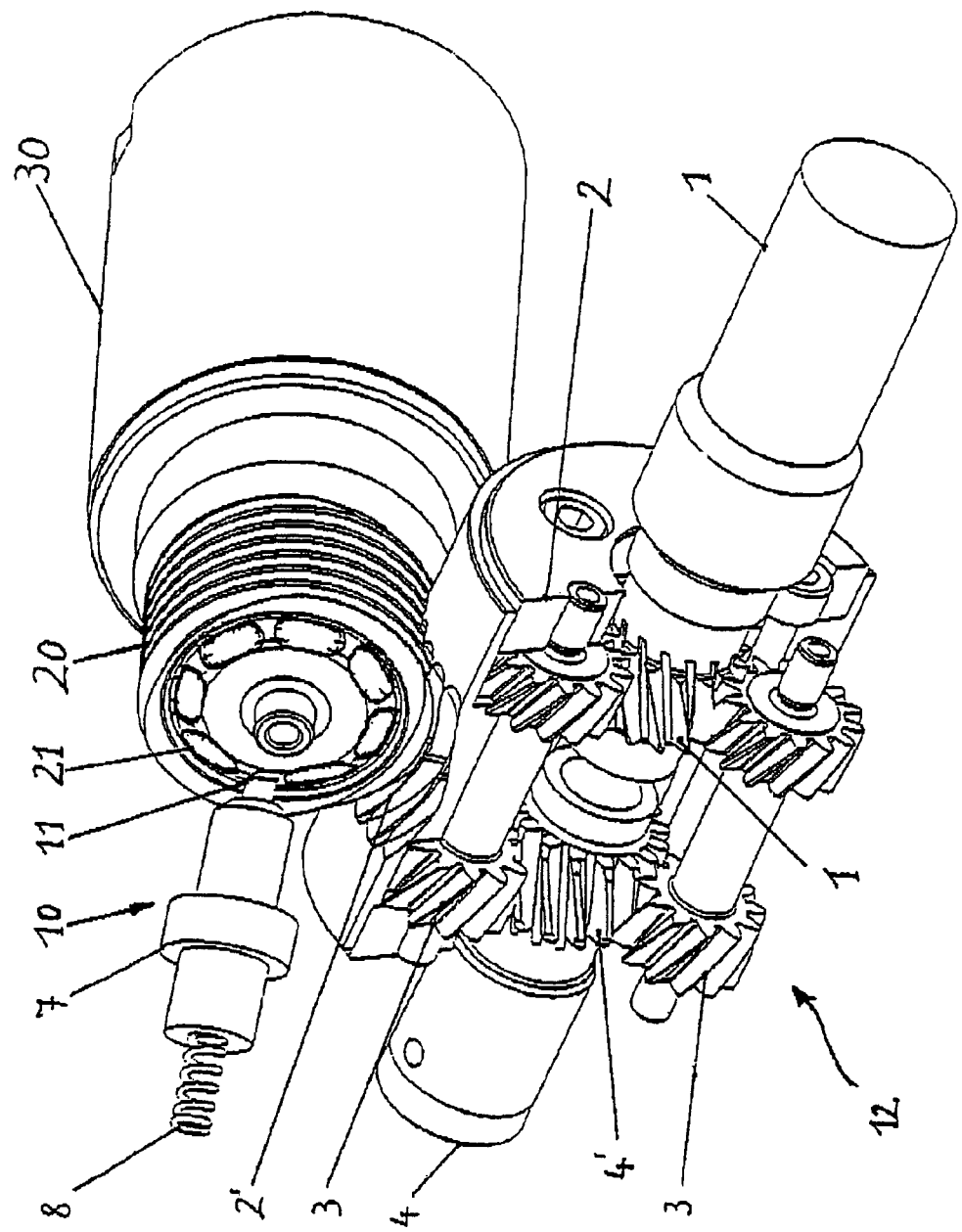
FIG. 1 shows a superimposing gear mechanism of a power steering system, at which an electric motor with a mechanical lock is disposed.

The construction of an inventive power-assisted steering system is shown diagrammatically in FIG. 1. It comprises a superimposing gear mechanism 12, which has a first input transmission element 1 and a second input transmission element 20, as well as an output transmission element 4. The first input transmission element 1 can be coupled to a steering handling device (not shown), which usually is a manual steering wheel. The output transmission element 4 can be coupled to a (not shown) steering transmission, which, in a known manner, passes on a steering movement, intensified by a hydraulic support, to the wheels of the vehicle. In the example shown here, the second input transmission element is constructed as a worm 20, which is coupled to an electric motor 30. The electric motor is a servomotor, which acts over the worm 20 on the superimposing shaft 2 of the super imposing gear mechanism 12. The power-assisted steering system shown is therefore a servo steering device, which enables a movement, emanating from the servomotor, to be superimposed on the movement, initiated by the manual steering wheel. An additional angle of rotation can therefore be added to or subtracted from the angle of rotation of the manual steering wheel.

If the servomotor 30 should now fail or its control system (refer to ECU in FIG. 2) operate defectively, the servomotor is switched off deliberately. In addition, the mechanical lock 10 is activated. If this were not the case, the danger could exist that the second input transmission element 20 of the superimposing gear mechanism rotates in an uncontrolled manner, because a counter holding moment is missing. In such a situation, reliable steering would accordingly no longer be possible.

The invention is based on the recognition that the conventional power-assisted steering systems, for which the superimposing gear mechanism has only a self-locking system, are not reliable. Investigations have revealed that the self-locking effect in known devices can be canceled by vibrations, oscillations or the like. In addition, other types of gear mechanisms, for which there is no or hardly any self-locking, would not be usable.

With the mechanical lock 10, mounted additionally pursuant to the invention, it is now reliably possible to prevent the second input transmission element 20 of the superimposing gear mechanism 12 from rotating further in the event of an intentional or unintentional failure of the servomotor 30. By these means, it is now ensured that, in the situation named, a steering motion, initiated with the help of the manual steering wheel, is transferred precisely in the steering transmission, even if vibrations occur in the vehicle. The elongated hole-shaped grooves 21 have the advantage that the locking pin 11 need not be positioned so precisely. Allowances are thus made for installation tolerances. The development of noise is also reduced, since it is very improbable that the locking pin 11, before it is locked in one of the groove 21, would first of all come into contact with an intermediate bridge and thus produce an unpleasant clacking noise.

The lock 10 acts immediately, even if the angular position of the rotor and, with that, the angular position of the input transmission element, that is, in this example, the angular position of the worm gear 20, is not aligned ideally with the position of the locking pin 11. Nevertheless, the grooves 21, constructed as elongated holes, bring about a secure, mechanical locking of the servomotor 30. The length of the grooves 21 preferably is dimensioned so that it limits the twisting to the maximum permissible angle tolerance of, for example, 10°. In the case of a transmission ratio of the worm gear of, for example, 1:40, the angular superimposition, still tolerated in the locked state, would not exceed 0.25°.

The power-assisted steering, shown in FIG. 1, will now be described in even greater detail.

The superimposing gear mechanism 12 includes the first input transmission element 1, the second input transmission element 20 and the output transmission element 4. The first input transmission element 1 is coupled in the vehicle to a manual steering wheel, which is not shown in FIG. 1. The second input transmission element 20 is driven by means of the servomotor 30. In this example, the servomotor preferably is constructed as an electric motor 30, which can be regulated infinitely variably. The output transmission element 4 is coupled in the vehicle to a steering transmission, which is not shown in FIG. 1.

The first input transmission element 1 is constructed as an input shaft with a sun gear 1'. The output transmission element 4 is constructed as an output shaft with a sun gear 4'. Both sun gears 1' and 4' mesh with a certain number of stepped planet gears 3, which are mounted rotatably in a planet carrier 2. The sun gears 1' and 4' as well as the planet gears 3 are constructed as helically toothed cylindrical gears. The planet carrier 2 is provided with external gearing 2', which engages the worm 20, which forms the second input transmission element here. The worm 20 can be driven directly by the servomotor 30. The elements 20 and 2 thus form a worm gear. Alternatively, other types of transmission, especially skew gear transmissions or also hypoid gear transmissions (bevel gear transmissions) can also be used.

As an essential innovation, a mechanical lock 10 is assigned to the second input transmission element 20. For this purpose, the following is provided in detail.

The skew gear 20 has a wreath of recesses on the front face, which are constructed as elongated hole-shaped grooves 21. Under the action of a spring 8, a pin 11 can engage these grooves 21. Normally, when the servomotor 30 is active, the pin 11 is prevented by a holding magnet 7 counter to the force of the spring 8 from making such an engagement. However, as soon as the servomotor fails or is deactivated intentionally, that is, as soon as the electric motor 30 is without current, the holding magnet 7 is also switched so that it is without current, so that the spring 8 pushes the locking pin 11 into one of the grooves 21 within a very short time. By these means, the worm 20 and, accordingly, indirectly also the planet carrier 2 are prevented from making any further rotational movement. As previously, the first input transmission element 1 transfers a rotational movement of the steering wheel over the stepped planet gears 3 to the output transmission element 4. However, the rotational angles and torques transferred are in a fixed transmission ratio, namely the so-called standard transmission ratio of the phase shifter gearbox 12.

Accordingly, in this situation, it is possible to steer the vehicle reliably with the utmost safety. In this situation, it is merely necessary to do without the help of the servomotor supporting the steering process.

If, in spite of the elongated hole-shaped grooves 21 that have been provided, the locking pin 11 comes into contact much too often with a connecting bridge as it engages or disengages and, accordingly, causes an unpleasant noise, an additional device, for example, in the form of a hydraulic shock absorber may be provided for damping the noise. Alternatively, the additional device may be realized owing to the fact that the locking pin and the armature of the magnet form separate components, between which a yielding intermediate element, such as a damping spring, is provided.

The example, described here, falls within a scope of the so-called AFS (active front steering), which has also been abbreviated to AS (active steering). The electric motor 30 is a converter-supplied, brushless DC motor, which can be blocked by a lock 10. The locking action is so large, that the motor 30 can be kept stationary, even when it puts out its maximum torque (Md=Mdmax, refer to FIG. 2). The lock therefore is a lock in the true sense and less so a brake or the like. The lock described, as well as the functional diagnosis, which will be described later on, can be used for different types of motor, such as an asynchronous motor or a brushed DC motor.

Figure 2:
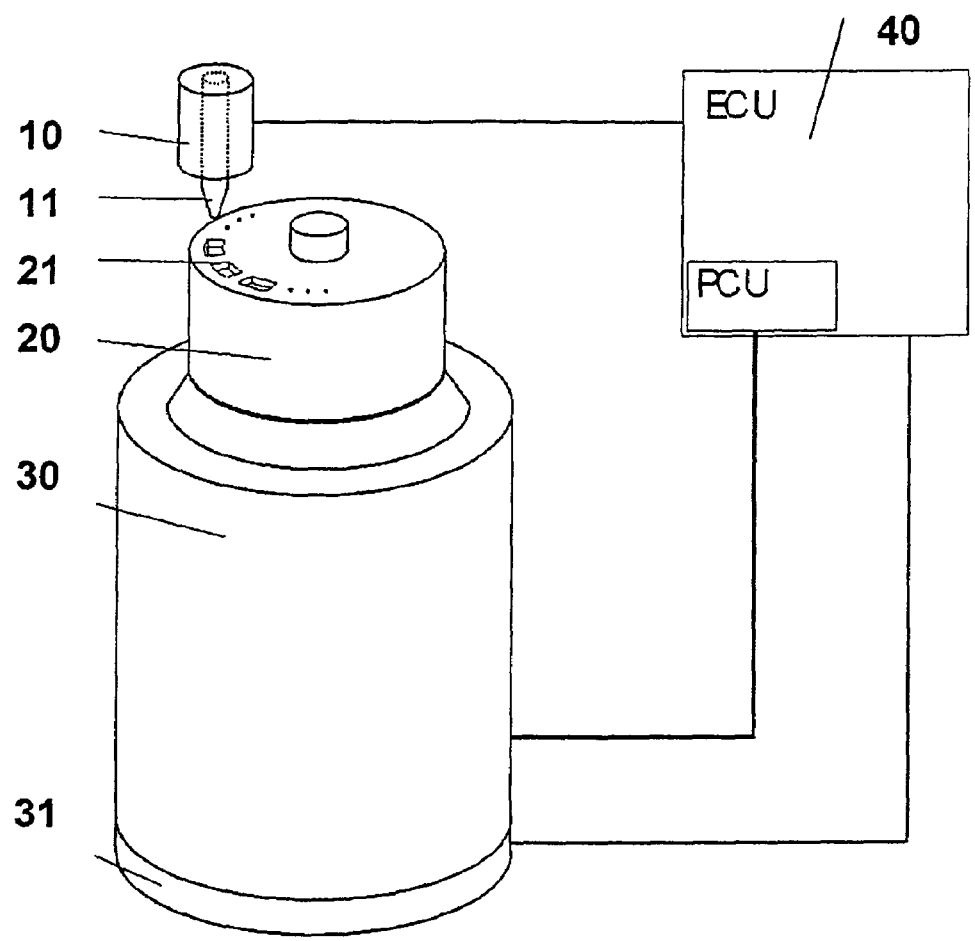
FIG. 2 shows details of the electric motor (servomotor) with electronic control and a mechanical lock, the locking pin of which engages an elongated hole-shaped groove, FIG. 3 in a section through the servomotor, shows the rotor, which rotates with respect to the stator.

The electric motor 30 and the lock 10 are shown in even greater detail in FIG. 2. As can be seen there, the pin 11, which may also be a bolt, engages elongated hole-shaped grooves 21, which are on the transmission part disposed thereon, here the worm 20. The grooves may also be provided at other places of the transmission part 20 or possibly also at the planet carrier (refer to "2" in FIG. 1). In the case of AS, the grooves 21 preferably are located on the worm 20. However, they may be located equally well on a gearwheel or a belt pulley.

It is the task of the lock 10 to block the motor 30 when the power is off. This means that the lock can always be inserted when the vehicle is switched off, that is, the ignition is switched off. The power-assisted steering, proposed here, also has at its disposal a diagnostic circuit 40, which checks the function of the lock 10. When the ignition is turned on, the AS is started up and, at the same time, the diagnosis, described in the following, is carried out.

To begin with, with the lock 10 closed at the electric motor 30, a stator field is set in the direction of the rotor field, that is, in the direction of the d axis of the rotor-fixed dq coordinate system (see FIG. 2). The direction of the rotor is obtained from a rotor position sensor, which may be a resolver, that is, an inductive sensor, or a magnetoresistive sensor. The contribution of the field is selected by the output of pre-defined voltages at the motor phases, so that the desired maximum moment arises when the stator field is perpendicular to the rotor field (in the q direction).

Figure 4:
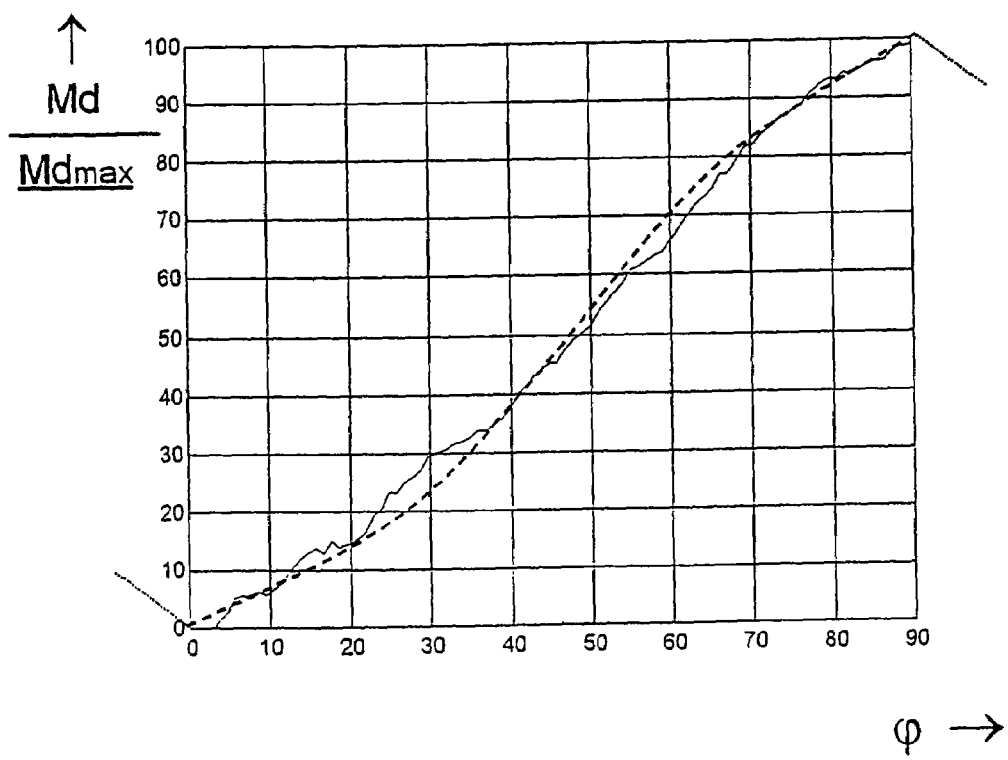
FIG. 4 shows the increase in the torque of the motor as the angle between the rotor and the stator increases from 0° to 90°.

Initially, however, since the two fields run parallel to one another, a torque is not produced and the motor does not move. The stator field is then rotated stepwise with respect to the rotor field, until the two fields finally are perpendicular to one another. At the same time, the torque produced at the motor shaft also increases from zero to the maximum value, which is reached at 90° (FIG. 4). The motor 30, at the same time, must not move, since it is blocked by the lock 10. It may happen occasionally that the locking pin 11 is not locked completely in a groove 21 (compare FIG. 2). In such cases, the rotor must not move further than the angle between two grooves. If the rotor moves during the build-up of the moment by more than the angle between two grooves, there is no locking action and there is a locking malfunction.

Figure 3:
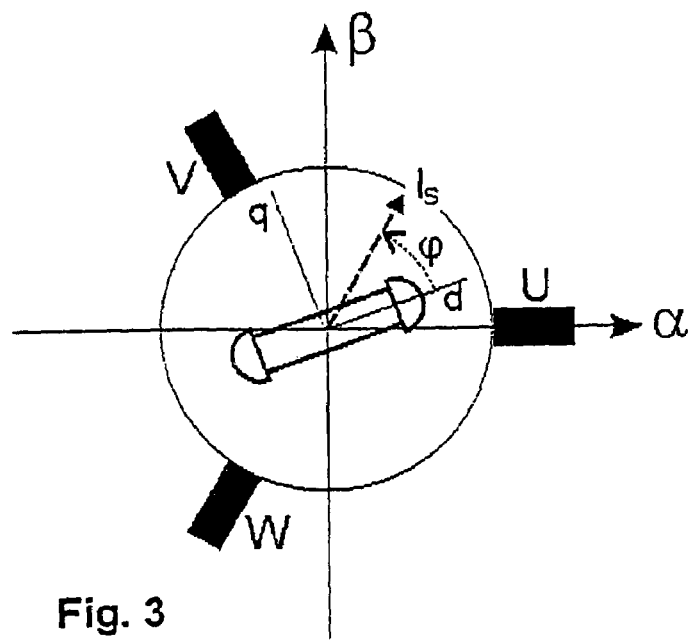

FIG. 3 shows the stator field, which is represented by the stator current $I_S$ and which rotates from a position of zero angle ($\Phi=0°$) up to the 90° position ($\Phi=90°$). In FIG. 4, the torque Md, which is building up, is given in relation to the maximum moment Mdmax. The broken line indicates the ideal sinusoidal course of the curve and the solid line shows the actual, measured course of the curve, which is affected, for instance, by the component tolerance and tolerance fluctuations of the angle position sensor.

In addition to checking the function of the lock 10, the diagnostic circuit 40 can also check the function of the current sensors in the leads supplying power to the motor as well as the connection of the leads between the output stage and the motor coils (phases U, V, W). After all, due to the rotational movement of the stator field through 90°, a current must flow at least intermittently in each phase. The level of these currents depends on the voltages put out as well as on the quality of the leads and contacts. If the value of zero or a different constant value is supplied by the current sensor during the whole of the process, then either the sensor is defective or the associated phase is not connected.

It is possible to differentiate between a malfunction of the sensor and one in the phase owing to the fact that, in the event that the phase is not connected, the two remaining phases carry the same current (with different algebraic signs), and the associated current sensors correspondingly supply the same value. On the other hand, if only the sensor is defective, the remaining current sensors supply values, which are different quantitatively.

The diagnostic method, described here, for which the torque Md is built up by rotating the stator field relative to the rotor, has, among other things, the following advantages:

It first of all enables the current sensors and motor phases to be tested, since all phases are supplied with power intermittently by means of the current converter circuit, which is also referred to as the power control unit (PCU). In addition, the maximum moment is also reached once during the rotational movement of the stator field, if the value, supplied by the positional sensor, is wrong. The method, proposed here, is therefore based essentially on a phase rotation of the stator field.

Alternatively, if one were to build up the torque strictly by increasing the amplitude, one would initially place the stator field perpendicularly to the rotor (q. direction) and subsequently increase the stator current only quantitatively from zero to the maximum. At the same time, however, there would be rotor positions, for which a phase is not supplied with current. Accordingly, it would not be possible to test this motor phase and the associated current sensor. Moreover, the full motor moment would not arise if the angle of the rotor position is wrong.

If the test of the lock and the current paths has been successful, the lock can be opened and the motor released for operation. The diagnostic circuit 40 can now also check the function of the sensor 41 for the position of the rotor (refer to FIG. 2).

If a field is now applied once again in the direction of the rotor field (d direction), the rotor, which is now freely rotatable, must not move. If it nevertheless does move, the value, supplied by the sensor 31 for the position of the rotor, would be wrong. Since the motor, in the installed state, moves only if the torques are larger, the error in the angle signal must be appreciable. It may amount to about 40° or more. The error occurring depends essentially on the friction at the motor shaft. If the error is only a small (less than 10°), the torque produced is relatively small and the motor cannot move. Such small faulty angles, however, basically do not represent a problem, since the motor functions in its accustomed manner. Only the efficiency is lower. On the other hand, if the faulty angle is larger (approximately 90°), the motor can start running in an uncontrolled manner and dangerous driving situations may arise, if the malfunction is not identified in a timely manner.

At the end of an ignition cycle, the rotor is positioned so that the locking pin falls into a groove. The positions of the grooves can be calculated from the starting position, which is stored at the start of the ignition cycle shortly before the lock is opened, and from the known groove spacing. The closest groove is always approached. Once this position is reached, the lock can be closed in an ideal way. This positioning method, carried out by the diagnostic circuit and the control circuit, offers, among other things, the advantage that noise, clacking or similar acoustic disorders do not occur, since the pin is already seated optimally in the groove during the locking test at the start of each ignition cycle.

The diagnosis circuit, 40 described can be regarded as an independent solution, which can check any type of locking. The diagnosis permits the state of the lock, of the motor leads and of the current sensors as well as of sensors for the position of the rotor to be determined within a very short time (a few 10 ms). It recognizes serious deficiencies in these components, which can have a negative effect on the safety of the system as a whole, already before the active operation and, accordingly, can contribute effectively to greater safety.

The invention claimed is:

1. Power-assisted steering comprising an electric motor and a superimposing gear mechanism which superimposes a correction angle on the steering angle specified at the steering handling device of a vehicle, the motor having a rotor moving a mechanical transmission part of the superimposing gear mechanism, the electric motor having a mechanical lock which, in addition to electrically deactivating the electric motor, immobilizes the mechanical transmission part of the superimposing gear mechanism at least in situations affected by a malfunction and secures it to prevent movement, the transmission part being provided with elongated hole-shaped grooves which are engaged by a pin of the mechanical lock and the lock is connected with a diagnostic circuit which checks the electric motor and the lock for a defect-free locking function before the lock is unlocked.

2. The power-assisted steering of claim 1, wherein the pin is mounted elastically and has a shape which runs out to a point and ensures that the pin engages the grooves at least to such an extent that the rotor of the electric motor remains immobilized even when the maximum torque is delivered.

3. The power-assisted steering of claim 1, wherein the mechanical part of the transmission of one of the two input transmission elements of the superimposing gear mechanism, immobilized by the lock, is a worm, a worm gear, a screw or a skew gear.

4. The power-assisted steering of claim 1, wherein the diagnostic circuit is connected with current sensors which measure the current supplied to the stator of the electric motor, and that the diagnostic circuit checks whether, when the torque (Md) is increasing, the current sensors indicate current values which are not equal to zero or, at least, change during the duration of the diagnosis.

5. The power-assisted steering of claim 1, wherein the diagnostic circuit monitors the supplying of the stator coils (u, v, w) of the electric motor with power and controls a stepwise rotation of the stator field with respect to the rotor field so that the torque Md, applied by the electric motor, increases from a value of zero up to a maximum value (Mdmax).

6. The power-assisted steering of claim 1, wherein the diagnostic circuit is connected with a rotor position sensor which measures the angular position of the rotor, and wherein the diagnostic circuit checks whether the rotor of the electric motor remains stationary when the torque (Md) is increasing.

7. The power-assisted steering of claim 6, wherein the rotor position sensor is an inductive sensor or a magnetoresistive sensor.

8. The power-assisted steering of claim 6, wherein the diagnostic circuit also checks the function of the rotor position sensor, and wherein the diagnostic circuit, when the rotor is unlocked mechanically, generates a stator field which is aligned in the direction of the rotor, and wherein the diagnostic circuit then monitors whether or not the rotor is moving.

9. The power-assisted steering of claim 6, wherein the diagnostic circuit, at the start of the ignition cycle and before the lock is unlocked, stores the angular position measured by the rotor position sensor and a control circuit (ECU) controls the electricity supplied to the electric motor in order to align the rotor by means of the stored angular position and the known groove spacing optimally onto the position of the locking pin.

* * * * *